United States Patent [19]

Luccarelli, Jr. et al.

[11] 4,374,123
[45] Feb. 15, 1983

[54] FLAVORING WITH 4-METHYL-3-CYCLOHEXENE-1-CARBOXYLIC ACID

[75] Inventors: Domenick Luccarelli, Jr., Ocean; Takao Yoshida, West Long Beach, both of N.J.

[73] Assignee: International Flavors & Fragrances Inc., New York, N.Y.

[21] Appl. No.: 322,842

[22] Filed: Nov. 19, 1981

[51] Int. Cl.³ .............................................. A23L 1/235
[52] U.S. Cl. ........................................ 424/49; 426/3; 426/538; 562/510; 424/365
[58] Field of Search .................. 426/538, 3; 424/49, 424/365; 562/510

[56] References Cited

U.S. PATENT DOCUMENTS 2,653,167  9/1953  Jansen et al. .................. 562/510 X
3,928,645  12/1975  Mookherjee et al. .............. 426/538
4,113,663  9/1978  Schenk ............................ 252/522 R

OTHER PUBLICATIONS

Arctander, Perfume and Flavor Chemicals, vol. II, 1969, Publ. by the author: Montclair, N.J., Items No. 2896, 2928.

Primary Examiner—Joseph M. Golian
Attorney, Agent, or Firm—Arthur L. Liberman

[57] ABSTRACT

Described is the use of the compound 4-methyl-3-cyclohexene-1-carboxylic acid having the structure:

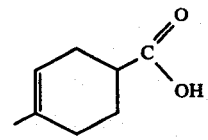

for augmenting or enhancing the aroma or taste of foodstuffs medicinal product, toothpaste and chewing gums. The said 4-methyl-3-cyclohexene-1-carboxylic acid is particularly useful in augmenting or enhancing the licorice, blueberry, fruity and seedy aroma and taste of blueberry, blackberry or raspberry flavored foodstuffs medicinal product, toothpaste or chewing gums.

4 Claims, 2 Drawing Figures

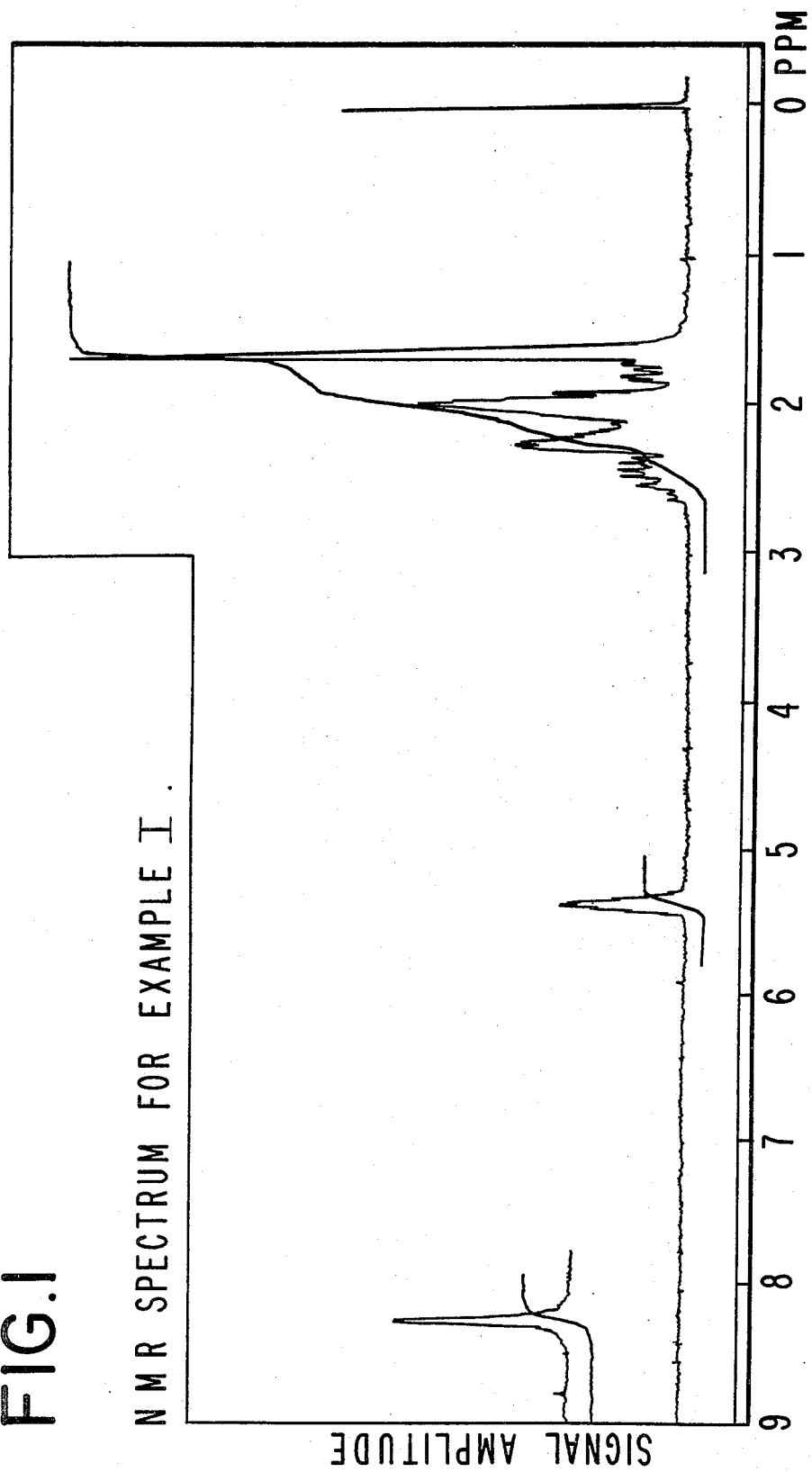

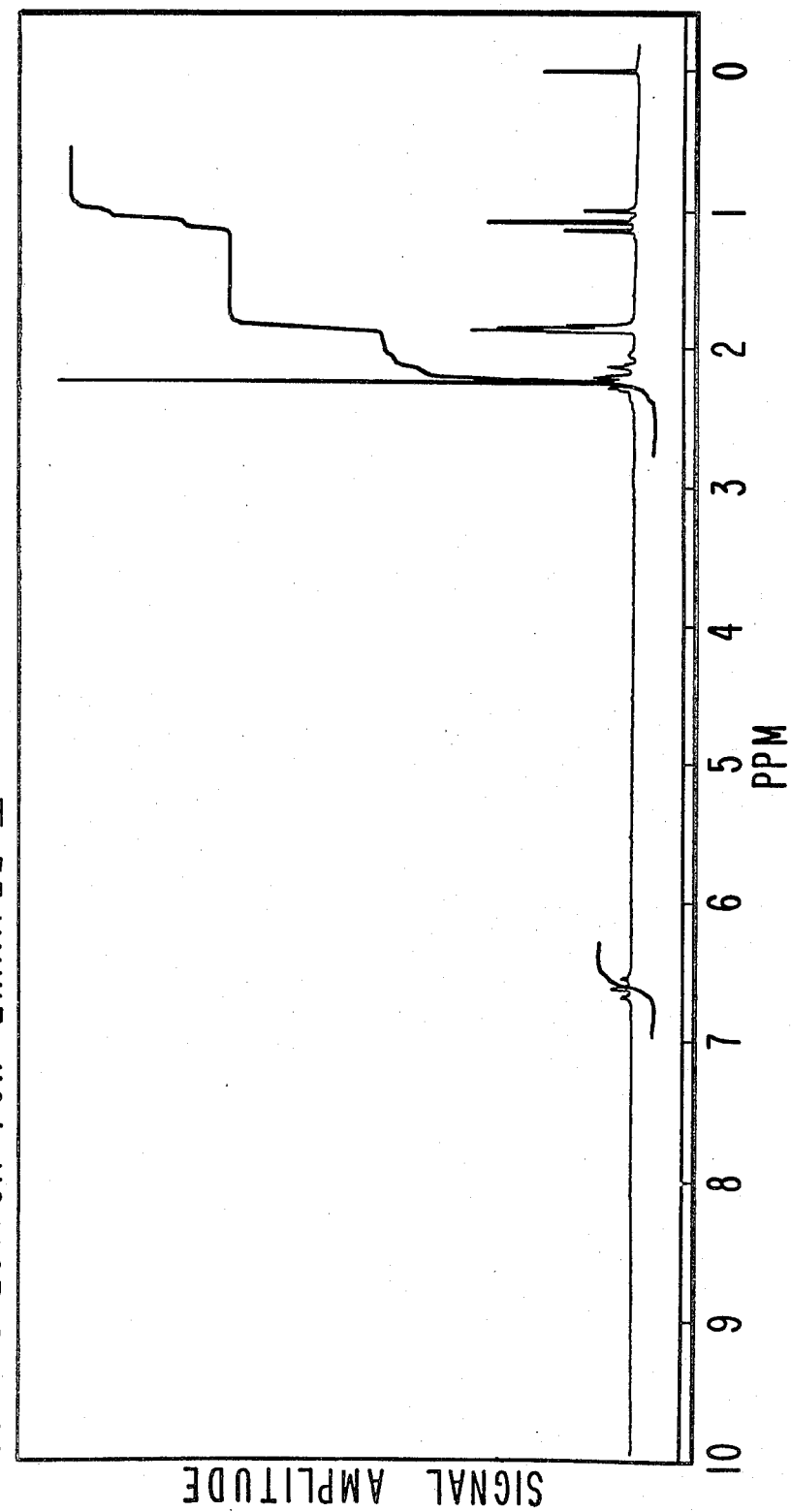

FLAVORING WITH 4-METHYL-3-CYCLOHEXENE-1-CARBOXYLIC ACID

BACKGROUND OF THE INVENTION

The instant invention relates to the use in augmenting or enhancing the aroma or taste of foodstuffs or chewing gums of the compound 4-methyl-3-cyclohexene-1-carboxylic acid having the structure:

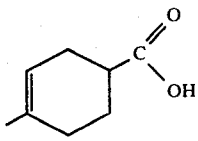

Materials which can provide licorice-like, blueberry, fruity and seedy aroma and taste nuances are well known in the art of flavoring for foodstuffs and chewing gums. Many of the natural materials which provide such flavor notes and contribute desired nuances to flavor and to flavoring compositions are high in cost, vary in quality from one batch to another and/or are generally subject to the usual variations of natural products.

There is, accordingly, a continuing effort to find synthetic materials which will replace, enhance or augment the essential flavor and fragrance notes provided by natural essential oils or compositions thereof. Unfortunately, many of these synthetic materials have the desired nuances only to a relatively small degree or else contribute undesirable or unwanted odor to the compositions. The search for materials which can provide a more refined blueberry flavor or raspberry flavor, for example, has been difficult and relatively costly in the areas of both natural products and synthetic products.

Artificial flavoring agents for foodstuffs have received increasing attention in recent years. For many years such food flavoring agents have been preferred over natural flavoring agents at least in part due to their diminished cost and their reproducible flavor qualities. For example, natural flavoring agents such as extracts, concentrates and the like are often subject to wide variations due to changes in quality, type and treatment of the raw materials. Such variations can be reflected in the end product and result in unfavorable flavor characteristics in said end product. Additionally, the presence of the natural product in the ultimate food may be undesirable because of increased tendency to spoil. This is particularly troublesome in food and food uses where such products as dips, ice cream desserts and yogurt desserts and the like are apt to be stored prior to use.

The fundamental problem in creating artificial flavor agents is that the artificial flavor to be achieved be as natural as possible. This generally proves to be a difficult task since the negativism for flavor development in many foods, medicinal products, chewing gums and toothpastes is not completely known. This is noticeable in products having raspberry and blueberry flavor characteristics, particularly.

Even more desirable are products that can serve to substitute for difficult to obtain natural flavoring agents in foodstuffs as well as chewing gums, medicinal products and toothpastes.

The use in augmenting or enhancing organoleptic properties, e.g. in perfumery, of cyclohexene carboxylic acid derivatives is well known. Thus, U.S. Pat. No. 4,113,663 discloses 2-ethyl-6,6-dimethyl-2-cyclohexene-1-carboxylic acid ethyl ester of the formula:

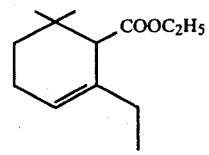

It is indicated in U.S. Pat. No. 4,113,663 that this compound has a particular odor and properties providing an extremely diffuse rose note of very remarkable radiance which is accompanied by honey-like, warm and spicy, fruity, berry-like side notes. It is further indicated that the woody, light flowery base note with fruity, berry-like side notes is reminiscent of dried fruits. Disclosed is the intermediate for preparing this ester, the carboxylic acid having the structure:

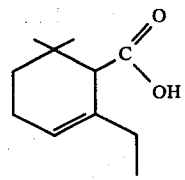

Also described in U.S. Pat. No. 4,113,663 are the following cyclohexene carboxylic acid esters and their organoleptic properties:

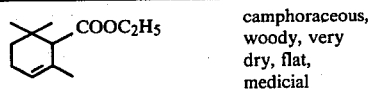
camphoraceous, woody, very dry, flat, medicial side-note

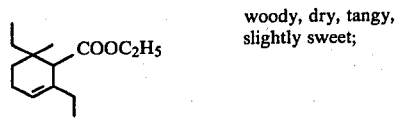
woody, dry, tangy, slightly sweet;

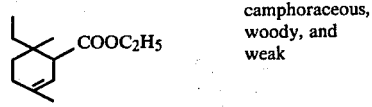
camphoraceous, woody, and weak and

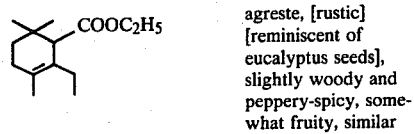
agreste, [rustic] [reminiscent of eucalyptus seeds], slightly woody and peppery-spicy, somewhat fruity, similar to tobacco.

No mention is made in U.S. Pat. No. 4,113,663 of the replacement by cyclohexene carboxylic acids of flavor nuances in blueberry and raspberry flavors.

BRIEF DESCRIPTION OF THE DRAWINGS

FIG. 1 is the NMR spectrum for the reaction product of Example I containing the compound having the structure:

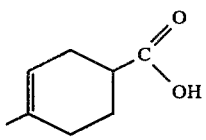

FIG. 2 is the IR spectrum for the reaction product of Example I consisting of the compound having the structure:

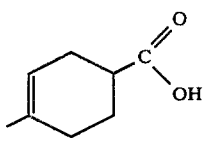

THE INVENTION

The present invention provides the compound having the structure:

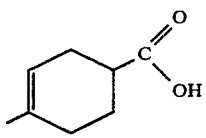

which can exist into forms "endo" having the structure:

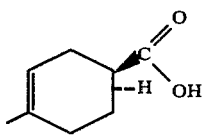

and "exo" having the structure:

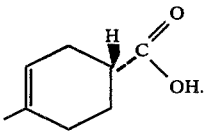

The compound having the structure:

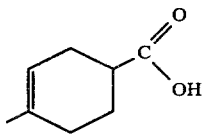

of our invention is capable of augmenting or enhancing licorice-like, blueberry, fruity and seedy aroma and taste nuances of blueberry, blackberry and raspberry flavored foodstuffs and chewing gums.

The compound having the structure:

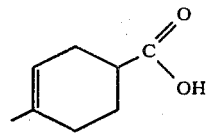

may be prepared by methods well known in the art, e.g., according to the reaction:

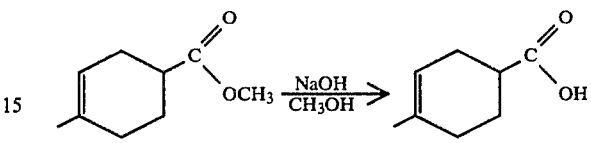

and this preparation is set forth in detail in Example I, infra.

When the 4-methyl-3-cyclohexene-1-carboxylic acid of our invention is used as a food flavor adjuvant, the nature of the co-ingredients included with said 4-methyl-3-cyclohexene-1-carboxylic acid of our invention used in formulating the product composition will also serve to alter, modify, augment or enhance the organoleptic characteristics of the ultimate foodstuff treated therewith.

As used herein in regard to flavors, the terms "alter", "modify" and "augment" in their various forms mean "supplying or imparting flavor character or note to otherwise bland, relatively tasteless substances or augmenting the existing flavor characteristic where a natural flavor is deficient in some regard or supplementing the existing flavor impression to modify its quality, character or taste".

The term "enhance" is used herein to mean the intensification of a flavor or aroma characteristic or note without the modification of the quality thereof. Thus, "enhancement" of a flavor or aroma means that the enhancement agent does not add any additional flavor note.

As used herein, the term "foodstuff" includes both solid and liquid ingestible materials which usually do, but need not have nutritional value. Thus, foodstuffs include soups, convenience foods, beverages, dairy products, candies, chewing gums, vegetables, cereals, soft drinks, snacks and the like.

As used herein, the term "medicinal product" includes both solids and liquids which are ingestible non-toxic materials which have medicinal value such as cough syrups, cough drops, aspirin and chewable medicinal tablets.

The term "chewing gum" is intended herein to mean a composition which comprises a substantially water-insoluble, chewable plastic gum base such as chickle, or substitutes therefor, including jelutong, guttakay, rubber or certain cosmetible natural or synthetic resins or waxes. Incorporated with the gum base in admixture therewith may be plasticizers or softening agents, e.g., glycerine, and a flavoring composition which incorporates the 4-methyl-3-cyclohexene-1-carboxylic acid of our invention, and in addition, sweetening agents which may be sugars, including sucrose or dextrose and/or artificial sweeteners such as cyclamates or saccharin. Other optional ingredients may also be present.

Substances suitable for use herein as co-ingredients or flavoring adjuvants are well known in the art for such use, being extensively described in the relevant literature. It is a requirement that any such material be "ingestibly" acceptable and thus non-toxic and otherwise non-deleterious, particularly from an organoleptic standpoint whereby the ultimate flavor and/or aroma of a consumable material used is not caused to have unacceptable aroma and taste nuances. Such materials may in general be characterized as flavoring agents or vehicles comprising broadly stabilizers, thickeners, surface agents, conditioners, other flavorants and flavor intensifiers.

Stabilizer compounds include preservatives, e.g. sodium chloride; antioxidants, e.g., calcium and sodium ascorbate, ascorbic acid, butylated hydroxy-anisole (mixture of 2- and 3-tertiary-butyl-4-hydroxy-anisole), butylated hydroxy toluene (2,6-di-tertiary-butyl-4-methyl phenol), propyl gallate and the like and sequestrants, e.g., citric acid.

Thickener compounds include carriers, binders, protective colloids, suspending agents, emulsifiers and the like, e.g., agar agar, carrageenan; cellulose and cellulose derivatives such as carboxymethyl cellulose and methyl cellulose, natural and synthetic gums such as gum arabic, gum tragacanth, gelatin, proteinaceous materials, lipids, carbohydrates; starches, pectins and emulsifiers, e.g., mono- and diglycerides of fatty acids, skim milk powder, hexoses, pentoses, disaccharides, e.g., sucrose, corn syrup and the like.

Surface active agents include emulsifying agents, e.g., fatty acids such as capric acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, cirtic acid, lactic acid, vinegar and the like, colorants, e.g., carminic acid, cochineal, tumeric and curcuma and the like; firming agents such as aluminum sodium sulfate, calcium chloride and calcium gluconate; texturizers, anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid and 2-methyl-cis-3-pentenoic acid; ketones and aldehydes, e.g., acetaldehyde, acetophenone, acetone, acetyl methyl carbinol, acrolein, n-butanal, crotonal, diacetyl, 2-methyl butanal, beta,-beta-dimethylacrolein, methyl-n-amyl ketone, n-hexanal, iso-pentanal, hydrocinnamic aldehyde, cis-3-hexenal, 2-heptanal, n-nonylaldehyde, 4-(p-hydroxyphenyl)-2-butanone, alpha-ionone, beta-ionone, methyl-3-butanone, benzaldehyde, β-damascone, β-damascenone, acetophone, 2-heptanone, o-hydroxyacetophone, 2-methyl-2-hepten-6-one, 2-octanone, 2-undecanone, 3-phenyl-4-pentenal, 2-phenyl-2-hexanal, 2-phenyl-2-pentenal, furfural, 5-methyl furfural, cinnamaldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanal, 2-heptanol, trans-2-hexenol-1, cis-3-hexen-1-ol, 3-methyl-3-buten-1-ol, 1-pentanol, 1-penten-3-ol, p-hydroxyphenyl-2-ethanol, isoamyl alcohol, isofenchyl alcohol, phenyl-2-ethanol, alpha-terpineol, cis-terpineol hydrate, eugenol, linalool, 2-heptanol, acetoin; esters, such as butyl acetate, ethyl acetate, ethyl acetoacetate, ethyl benzoate, ethyl butyrate, ethyl caprate, ethyl caproate, ethyl caprylate, ethyl cinnamate, ethyl crotonate, ethyl formate, ethyl isobutyrate, ethyl isovalerate, ethyl laurate, ethyl myristate, ethyl alpha-methylbutyrate, ethyl propionate, ethyl salicylate, trans-2-hexenyl acetate, hexyl acetate, 2-hexenyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate and terpenyl acetate; hydrocarbons such as dimethyl naphthalene, n-dodecane, methyl diphenyl, methyl naphthalene, mycrene, naphthalene, n-octadecane, n-tetradecane, tetramethyl naphthalene, n-tridecane, trimethyl naphthalene, undecane, caryophyllene, 1-phellandrene, p-cymene and 1-alpha-pimene; pyrazines such as 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-isoamyl-2,3-dimethylpyrazine, 2-isoamyl-3,5,6-trimethylpyrazine, 2-isopropyl-4,5-dimethylpyrazine, 1-methyl-2-ethylpyrazine, tetramethylpyrazine, trimethylpyrazine, essential oils, such as jasmine absolute, cassia oil, cinnamon barl oil, rose absolute, orris absolute, lemon essential oil, Bulgarian rose, yara yara and vanilla, lactones such as delta nonalactone, gamma nonalactone, delta dodecalactone, gamma dodecalactone, sulfides, e.g., methyl sulfide and other materials such as maltol, acetoin and acetals (e.g., 1,1-diethoxyethane, 1,1-dimethoxyethane and dimethoxymethane).

The specific flavoring adjuvant selected for use may be either solid or liquid depending upon the desired physical form of the ultimate product, i.e., foodstuff, whether simulated or natural, and should, in any event, (i) be organoleptically compatible with the 4-methyl-3-cyclohexene-1-carboxylic acid of our invention by not covering or spoiling the organoleptic properties (aroma and/or taste) thereof; (ii) be non-reactive with the 4-methyl-3-cyclohexene-1-carboxylic acid of our invention and (iii) be capable of providing an environment in which the 4-methyl-3-cyclohexene-1-carboxylic acid of our invention can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff, chewing gum, medicinal product or toothpaste to which the flavor and/or aroma are to be imparted, modified, altered or enhanced. In contradistinction, in the preparation of solid products, e.g., simulated foodstuffs, ingredients capable of providing normally solid compositions should be selected such as various cellulose derivatives.

As will be appreciated by those skilled in the art, the amount of the 4-methyl-3-cyclohexene-1-carboxylic acid employed in a particular instance can vary over a relatively wide range, depending upon the desired organoleptic effects to be achieved. Thus, correspondingly, greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected be effective, i.e., sufficient to alter, modify or enhance the organoleptic characteristics of the parent composition, whether foodstuff per se, chewing gum per se, medicinal product per se, toothpaste per se, or flavor composition.

The use of insufficient quantities of 4-methyl-3-cyclohexene-1-carboxylic acid will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions and toothpaste compositions, it is found that quantities of 4-methyl-3-cyclohexene-1-carboxylic acid ranging from a small but effective amount, e.g., 0.05 parts per million up to about 300 parts per million based on total composition are suitable. Concentrations in excess of the maximum quantity stated are not normally recommended, since they fail to provide commensurate enhancement of organoleptic properties. In those instances, wherein 4-methyl-3-cyclohexene-1-carboxylic acid are added to the foodstuff as an integral component of a flavoring composition, it is, of course, essential that the total quantity of flavoring composition employed be sufficient to yield an effective concentration of 4-methyl-3-cyclohexene-1-carboxylic acid in the foodstuff product.

Food flavoring compositions prepared in accordance with the present invention preferably contain 4-methyl-3-cyclohexene-1-carboxylic acid in concentrations ranging from about 0.1% up to about 15% by weight on the total weight of the said flavoring composition.

The composition described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing 4-methyl-3-cyclohexene-1-carboxylic acid with, for example, gum arabic, gum tragacanth, carrageenan and the like, and thereafter spray-drying the resultant mixture whereby to obtain the particulate solid product. Pre-prepared flavor mixes in powder form, e.g., fruit flavored powder mixes are obtained by mixing the dried solid components e.g., starch, sugar and the like and 4-methyl-3-cyclohexene-1-carboxylic acid in a dry blender until the requisite degree of uniformity is achieved.

It is presently preferred to combine with 4-methyl-3-cyclohexene-1-carboxylic acid of our invention, the following adjuvants:

p-Hydroxybenzyl acetone;
Geraniol;
Cassia Oil;
Acetaldehyde;
Maltol;
Ethyl methyl phenyl glycidate;
Benzyl acetate;
Dimethyl sulfide;
Eugenol;
Vanillin;
Caryophyllene;
Guaiacol;
Ethyl pelargonate;
Cinnamaldehyde;
Methyl Anthranilate;
5-Methyl furfural;
Isoamyl acetate;
Isobutyl acetate;
Cuminaldehyde;
Alpha ionone;
Cinnamyl formate;
Ethyl butyrate;
Methyl cinnamate;
Acetic acid;
Gamma-undecalactone;
Naphthyl ethyl ether;
Diacetyl;
Furfural;
Ethyl acetate;
Anethole;
2,3-Dimethyl pyrazine;
2-Ethyl-3-methyl pyrazine;
3-Phenyl-4-pentenal;
2-Phenyl-2-hexanal;
2-Phenyl-2-pentenal;
3-Phenyl-4-pentenal diethyl acetal;
Beta-Damascone (1-crotonyl-2,6,6-trimethylcyclohex-1-ene);
Beta-Damascenone (1-crotonyl-2,6,6-trimethylcyclohexa-1,3-diene);
Beta-cyclohomocitral (2,6,6-trimethylcyclohex-1-ene carboxaldehyde)
Isoamyl butyrate;
Cis-3-hexanol-1;
2-Methyl-2-pentenoic acid;
Elemecine (4-allyl-1,2,6-trimethoxybenzene);
Isoelemecine (4-propenyl-1,2,6-trimethoxybenzene); and
2-(4-Hydroxy-4-methylpentyl) norbornadiene.

The following Example I sets forth a process for preparing the 4-methyl-3-cyclohexene-1-carboxylic acid useful in our invention. The Examples following Example I represent methods for using the 4-methyl-3-cyclohexene-1-carboxylic acid of our invention for its organoleptic properties. Unless otherwise indicated, all parts and percentages are by weight.

EXAMPLE I

PREPARATION OF 4-METHYL-3-CYCLOHEXENE-1-CARBOXYLIC ACID

Reaction:

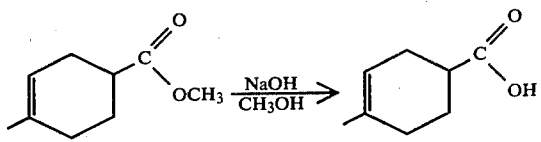

into 1 liter reaction flask equipped with stirrer thermometer reflux condenser and heating mantle is placed 100 ml anhydrous methyl, 1.25 moles (100 grams) of 50% aqueous NOAH solution, 100 ml water and 154 grams (1 mole) of the methyl ester of 4-methyl-cyclohexene-1-carboxylic acid. The reaction mass is stirred for a period of 5 hours at room temperature and then extracted with 1 volume of diethyl ether. The aqueous layer is set aside with 10% hydrochloric acid and extracted with diethyl ether. The diethyl ether extracts are washed with saturated sodium chloride solution and the ether is evaporated yielding 100.5 grams of solid melting at 95° C. This material is the carboxylic acid having the structure:

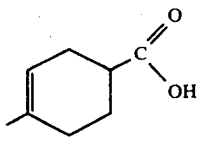

as confirmed by NMR and IR analysis.

The NMR spectrum is set forth in FIG. 1 for this compound. The IR spectrum is set forth in FIG. 2 of this compound.

The resulting compound has a sweaty cuminic aroma with castoreum under tones (fresh) and a sweaty cuminic cedar like aroma on dry out.

EXAMPLE II

BASIC RASPBERRY FORMULATION

The following basic raspberry formulation is prepared:

| Ingredients | Parts by Weight |
| --- | --- |
| Vanillin | 2.0 |
| Maltol | 5.0 |
| Parahydroxybenzylacetone | 5.0 |
| Alpha-ionone (10% in propylene glycol) | 2.0 |
| Ethyl butyrate | 6.0 |
| Ethyl acetate | 16.0 |
| Dimethyl sulfide | 1.0 |
| Isobutyl acetate | 13.0 |
| Acetic acid | 10.0 |
| Acetaldehyde | 10.0 |
| Propylene glycol | 930.0 |

To a first portion of the basic formulation, 4-methyl-3-cyclohexene-1-carboxylic acid produced according to Example I is added at the rate of 1%. Nothing is added to the second portion of this formulation. Both flavors with and without the 4-methyl-3-cyclohexene-1-carboxylic acid are compared at the rate of 100 parts per million by a bench panel of experts. The flavor containing the 4-methyl-3-cyclohexene-1-carboxylic acid is considered to have a more raspberry kernel, more seedy and more natural character in both aroma and taste. The flavor is therefore preferred as more true to the taste of natural raspberries.

EXAMPLE III

The following mixture is prepared:

| Ingredients | Parts by Weight |
| --- | --- |
| Natural raspberry concentrate | 2.5% |
| Juice | 85.0% |
| Water | 12.5% |

The ripened raspberry and seedy raspberry kernel note of this raspberry juice is imparted in increased strength by the addition of the 4-methyl-3-cyclohexene-1-carboxylic acid prepared according to Example I at the rate of from 0.02 ppm up to 10 ppm.

EXAMPLE IV

To the raspberry formulation set forth in Example II, the compound 4-methyl-3-cyclohexene-1-carboxylic acid prepared according to Example I is added at the rate of 0.2%. This material is then called the "test composition". The raspberry formulation without the 4-methyl-3-cyclohexene-1-carboxylic acid is called the "control composition".

The test and control compositions are added to the food products described hereinafter in the proportions shown for 10 kilograms of material to be flavored:

Pudding: 5–10 grams (0.05–0.1%)
Cooked sugar: 15–20 grams (0.15–0.20%).

Cooked sugar—100 ml of sugar syrup (prepared by dissolving 1 kilogram of sucrose in 600 ml of water) and 20 grams of glucose are mixed together and slowly heated to 145° C. The flavor is added and the mass is allowed to cool and harden.

Pudding—to 500 ml of warm milk are added with stirring a mixture of 60 grams of sucrose and 3 grams of pectin. The mixture is boiled for a few seconds and the flavor is added. The mixture is allowed to cool.

The finished foodstuff samples are tested by a panel of trained persons who express their views about the flavor of the samples. All members of the panel prefer the test samples having a more distinguished ripened raspberry aroma with a taste of ripe raspberries and its seedy kernel note.

An improved effect occurs when a mixture of 25:25:50 of 2-(4-hydroxy-4-methylpentyl)-norboradiene:compound having the structure:

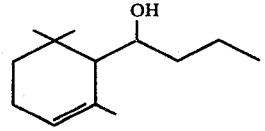

: 4-methyl-3-cyclohexene-1-carboxylic acid produced according to Example I is added at the rate of 0.02 parts per million up to about 10 parts per million to each of the aforementioned foodstuffs.

EXAMPLE V

A. Powder Flavor Composition

20 Grams of the flavor composition of Example II containing 4-methyl-3-cyclohexene-1-carboxylic acid prepared according to Example I is emulsified in a solution containing 300 grams gum acacia and 700 grams water. The emulsion is spray-dried with a Bowen Lab Model Drier utilizing 260 c.f.m. of air and an inlet temperature of 500° F., an outlet temperature of 200° F. and a wheel speed of 50,000 rpm.

B. Sustained Release Flavor

The following mixture is prepared:

| Ingredients | Parts by Weight |
| --- | --- |
| Liquid raspberry flavor of Example II | 20 |

| Ingredients | Parts by Weight |
| --- | --- |
| Propylene Glycol | 9 |
| Cab-O-Sil ® M-5 (Brand of silica produced by the Cabot Corporation of 125 High Street, Boston, Mass. 02112: Physical properties: Surface area: 200 m²/gm Nominal particle size: 0.012 microns Density: 2.3 lbs/cu. ft.) | 5 |

The Cab-O-Sil ® is dispersed in the liquid raspberry flavor composition of Example II with vigorous stirring thereby resulting in a viscous liquid. 71 Parts by weight of the powder flavor composition of Part A, supra, is then blended into the said viscous liquid with stirring at 25° C. for a period of 30 minutes resulting in a dry, free-flowing, sustained release raspberry flavor powder.

EXAMPLE VI

10 Parts by weight of 5-Bloom pigskin gelatin is added to 90 parts by weight water at a temperature of 150° F. The mixture is agitated until the gelatin is completely dissolved and the solution is cooled to 120° F. 20 Parts by weight of the liquid raspberry flavor composition of Example II is added to the solution which is then homogenized to form an emulsion having particle size typically in the range of 2–5 microns. This material is kept at 120° F. under which conditions the gelatin will not gel.

Coacervation is induced by adding, slowly and uniformly, 40 parts by weight of a 20% aqueous solution of sodium sulfate. During coacervation, the gelatin molecules are deposited uniformly about each oil droplet as a nucleus.

Gelation is effected by pouring the heated coacervate mixture into 1,000 parts by weight of 7% aqueous solution of sodium sulfate at 65° F. The resulting gelled coacervate may be filtered and washed with water at temperatures below the melting point of gelatin, to remove the salt.

EXAMPLE VII

CHEWING GUM

100 Parts by weight of chicle are mixed with 4 parts by weight of the flavor prepared in accordance with Example V. 300 Parts of sucrose and 100 parts of corn syrup are added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long-lasting raspberry flavor.

EXAMPLE VIII

CHEWING GUM

100 Parts by weight of chicle are mixed with 18 parts by weight of the flavor prepared in accordance with Example VI. 300 Parts of sucrose and 100 parts of corn syrup are added. Mixing is effected in a ribbon blender with jacketed walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long-lasting raspberry flavor.

EXAMPLE IX

TOOTHPASTE FORMULATION

The following separate groups of ingredients are prepared:

| Parts by Weight | Ingredient |
| --- | --- |
| Group "A" | |
| 30.200 | Glycerine |
| 15.325 | Distilled water |
| .100 | Sodium benzoate |
| .125 | Saccharin sodium |
| .400 | Stannous fluoride |
| Group "B" | |
| 12.500 | Calcium carbonate |
| 37.200 | Dicalcium phosphate (dihydrate) |
| Group "C" | |
| 2.000 | Sodium n-lauroyl sarcosinate (foaming agent) |
| Group "D" | |
| 1.200 | Flavor material of Example V, Part B |
| 100.00 (total) | |

Procedure:
1. The ingredients in Group "A" are stirred and heated in a steam jacketed kettle to 160° F.
2. Stirring is continued for an additional three to five minutes to form a homogeneous gel.
3. The powders of Group "B" are added to the gel, while mixing, until a homogeneous paste is formed.
4. With stirring, the flavor of "D" is added and lastly the sodium n-lauroyl sarcosinate.
5. The resultant slurry is then blended for one hour. The completed paste is then transferred to a three roller mill and then homogenized, and finally tubed.

The resulting toothpaste, when used in a normal toothbrushing procedure, yields a pleasant raspberry flavor of constant strong intensity throughout said procedure (1–1.5 minutes).

EXAMPLE X

CHEWABLE VITAMIN TABLETS

The flavor material produced according to the process of Example V, Part B is added to a chewable vitamin tablet formulation at the rate of 10 grams/kilogram which chewable vitamin tablet formulation is prepared as follows:

In a Hobart Mixer the following materials are blended to homogeneity:

| | Gms./1000 tablets |
| --- | --- |
| Vitamin C (ascorbic acid) as ascorbic acid-sodium ascorbate mixture 1:1 | 70.00 |
| Vitamin $B_1$ (thiamine mononitrate) as Rocoat ® thiamine mononitrate 33⅓% (Hoffman La Roche) | 4.0 |
| Vitamin $B_2$ (riboflavin) as Rocoat ® riboflavin 33⅓% | 5.0 |
| Vitamin $B_6$ (pyridoxine hydrochloride) as Rocoat ® pyridoxine hydrochloride 33⅓% | 4.0 |
| Niacinamide as Rocoat ® niacinamide | |

| | |
|---|---|
| 33⅓% | 33.0 |
| Calcium pantothenate | 11.5 |
| Vitamin B₁₂ (cyanocobalamin) as Merck 0.1% in gelatin | 3.5 |
| Vitamin E (di-alpha tocopheryl acetate) as dry Vitamin E acetate 33⅓% | |
| Roche d-biotin | 6.6 |
| Flavor of Example V, Part B | 0.004 (as indicated above) |

| | Gms./100 tablets |
|---|---|
| Certified lake color | 5.0 |
| Sweetener - sodium saccharin | 1.0 |
| Magnesium stearate lubricant | 10.0 |
| Mannitol q.s. to make | 500.0 |

Preliminary tablets are prepared by slugging with flatfaced punches and grinding the slugs to 14 mesh. 13.5 Grams dry Vitamin A acetate and 0.6 grams Vitamin D are then added as beadlets. The entire blend is then compressed using concave punches at 0.5 grams each.

Chewing of the resultant tablets yields a pleasant, long-lasting, consistently strong raspberry flavor for a period of 12 minutes.

What is claimed is:

1. A process for augmenting or enhancing the aroma or taste of a blueberry, raspberry or blackberry flavored foodstuff, chewing gum, medicinal product or toothpaste comprising the step of adding to a foodstuff, medicinal product, toothpaste or chewing gum base from 0.05 parts per million up to about 300 parts per million based on the total composition of 4-methyl-3-cyclohexene-1-carboxylic acid.

2. The process of claim 1 wherein the 4-methyl-3-cyclohexene-1-carboxylic acid is added to a foodstuff.

3. The process of claim 1 wherein the 4-methyl-3-cyclohexene-1-carboxylic acid is added to a chewing gum.

4. The process of claim 1 wherein in addition to the 4-methyl-3-cyclohexene-1-carboxylic acid added to the foodstuff, chewing gum, toothpaste or medicinal product, there is also added 2-(4-hydroxy-4-methylpentyl)-norbornadiene and the compound having the structure:

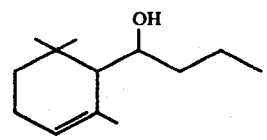

* * * * *